United States Patent [19]

Yamada et al.

[11] 4,443,507
[45] Apr. 17, 1984

[54] HEAT-MOLDABLE LAMINATE AND PROCESS FOR MOLDING SAID LAMINATED STRUCTURES

[75] Inventors: Kozo Yamada; Takayuki Tanaka, both of Shizuoka, Japan

[73] Assignee: Toho Beslon Co., Ltd., Tokyo, Japan

[21] Appl. No.: 413,117

[22] Filed: Aug. 30, 1982

Related U.S. Application Data

[63] Continuation-in-part of Ser. No. 115,851, Jan. 28, 1980, abandoned.

[30] Foreign Application Priority Data

Jan. 26, 1979 [JP] Japan .................................... 54-7228
Jul. 30, 1980 [JP] Japan ................................ 55-100155

[51] Int. Cl.³ .......................... B32B 7/00; B32B 27/00
[52] U.S. Cl. .................................... 428/114; 428/904;
264/239; 264/257; 264/319; 264/324; 264/544;
264/550; 428/212; 428/245; 428/252; 428/253;
428/412; 428/413; 428/430; 428/435; 428/436;
428/440; 428/441; 428/442; 428/443;
428/475.8; 428/476.1; 428/476.3; 428/476.9;
428/483; 428/492; 428/500; 428/515; 428/516;
428/518; 428/520; 428/522; 428/902

[58] Field of Search .............. 428/114, 212, 245, 252,
428/253, 412, 413, 430, 435, 436, 440, 441, 442,
443, 475.8, 476.1, 476.3, 476.9, 403, 492, 500,
515, 516, 518, 520, 522, 902, 904; 264/544, 550,
239, 257, 319, 324

[56] References Cited

FOREIGN PATENT DOCUMENTS 1301023 12/1972 United Kingdom .

*Primary Examiner*—Marion McCamish
*Attorney, Agent, or Firm*—Sughrue, Mion, Zinn, Macpeak and Seas

[57] ABSTRACT

A heat-moldable laminate comprising at least one thermoplastic resin layer, at least one fiber reinforced cured thermosetting resin layer, and at least one slippage layer interposed therebetween and bonding the resin layers, said slippage layer comprising a thermoplastic resin and said slippage layer being capable of being molten at lower temperatures than the moldable temperature of the thermoplastic resin layer, and a process for molding the heat-moldable laminate to produce a molded article having excellent strength and rigidity is disclosed.

26 Claims, 5 Drawing Figures

HEAT-MOLDABLE LAMINATE AND PROCESS FOR MOLDING SAID LAMINATED STRUCTURES

This application is a continuation in part of Ser. No. 115,851 filed Jan. 28, 1980, now abandoned.

BACKGROUND OF THE INVENTION

1. Field of the Invention

This invention relates to a laminate or sandwich construction comprising at least one thermoplastic resin layer, at least one fiber reinforced cured thermosetting resin layer and at least one slippage layer interposed therebetween which can be molded by heating.

2. Description of the Prior Art

In general, fiber reinforced thermosetting resins have excellent strength and rigidity, and they are useful in those applications where high strength and rigidity are required. However, after being cured, they are not easily molded in to the shapes desired. On the other hand, thermoplastic resins have excellent moldability and they can relatively freely be molded into desired shapes. Thermoplastic resins, however, have markedly low mechanical properties such as strength, rigidity, etc. as compared with the fiber reinforced thermosetting resins.

For this reason, there is a need for structures having the characteristics of thermoplastic resins, i.e., high moldability and those of thermosetting resins, i.e., high strength and rigidity at the same time.

SUMMARY OF THE INVENTION

An object of this invention is to provide a laminate having the characteristics of thermoplastic resins, i.e., high moldability, and those of thermosetting resins, i.e., high strength and rigidity at the same time.

Another object of this invention is to provide a process for producing a molding having excellent strength and rigidity by molding a laminate as described above by heating.

This invention, therefore, provides a heat-moldable laminate comprising at least one thermoplastic resin layer, at least one fiber reinforced cured thermosetting resin layer, and at least one slippage layer interposed therebetween, wherein the resin layers are bonded with the slippage layer, wherein the slippage layer comprises a thermoplastic resin and is capable of being molten at lower temperatures than the moldable temperature of the thermoplastic resin layer, and a process for producing a molded article having high strength and rigidity by heating the above laminate to the moldable temperature of the thermoplastic resin constituting the thermoplastic resin layer.

DETAILED DESCRIPTION OF THE INVENTION

The term "moldable temperature" as used herein is the minimum temperature at which a thermoplastic resin can be deformed such that the deformed resin substantially does not change the form of the deformation after cooling.

The laminate of this invention will be explained in detail with reference to FIGS. 1 through 5, wherein (1), (1a), (1b), (1c), (1d) and (1e) indicate fiber reinforced cured thermosetting resin layers, (2), (2a), (2b), (2c), (2d) and (2e) indicate slippage layers, and (3), (3a), (3b), (3c), (3d) and (3e) indicate thermoplastic resin layers respectively.

Figure 1:
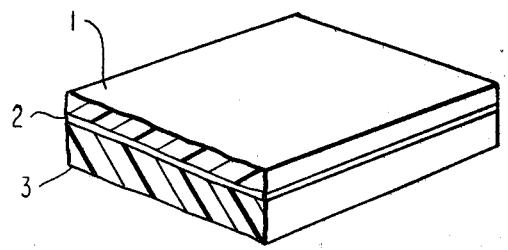
FIGS. 1 and 2 are perspective views of embodiments of the laminate of this invention.

FIG. 1 illustrate the simplest structure of this invention, which comprises a fiber reinforced cured thermosetting resin layer (1), a thermoplastic resin layer (3) and a slippage layer (2) interposed between the cured thermosetting resin layer (1) and the thermoplastic resin layer (3).

Figure 2:
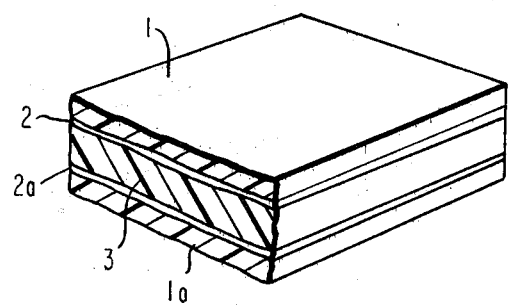

FIG. 2 illustrates another laminated structure of this invention, in which cured thermosetting resin layers (1) and (1a) are provided on both sides of a thermoplastic resin layer (3) with slippage layers (2) and (2a) interposed between the cured thermosetting resin layer (1) and the thermoplastic resin layer (3), and the fiber reinforced thermosetting resin layer (1a) and the thermoplastic resin layer (3), respectively.

Figure 3:
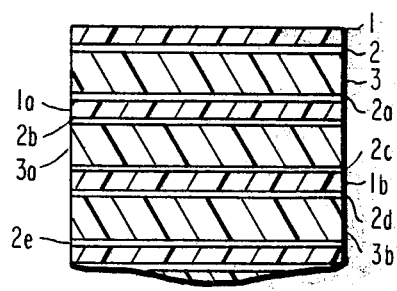
FIGS. 3 and 4 are cross-sectional views of other embodiments of the laminate of this invention.

FIG. 3 illustrates another laminated structure of this invention having the same construction as that of FIG. 2 except the number of the layers constituting the laminated structure is increased. This laminated structure is a preferred example for increasing the total thickness of the cured thermosetting resin layers, in which structure a number of thin fiber reinforced cured thermosetting resin layers (1), (1a), (1b), . . . and thermoplastic resin layers (3), (3a), (3b), . . . are superposed on each other with slippage layers (2), (2a), (2b), . . . interposed between them.

Figure 4:
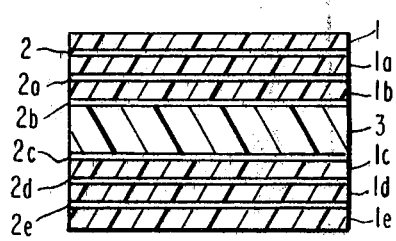

FIG. 4 illustrates another laminated structure of this invention in which the total thickness of the cured thermosetting resin layers is increased as with the laminated structure shown in FIG. 3. In this structure, cured thermosetting resin layers (1), (1a) and (1b) superposed on each other with slippage layers (2), (2a) and (2b) interposed between them, and cured thermosetting resin layers (1c), (1d) and (1e) superposed on each other with slippage layers (2c), (2d) and (2e) interposed between them are provided on opposite sides of a thermoplastic resin layer (3). In other embodiments having the same structure as this laminated structure, the thermoplastic resin layer can be provided at locations as desired. In some cases, the desired number of thermoplastic resin layers can be provided in a laminated structure comprising a number of thermosetting resin layers, and in some cases, on the outside of the laminated structure.

Thermosetting resins which can be used in preparing the fiber reinforced thermosetting resin layer of this invention, include, for example, epoxy resins such as bisphenol A diglycidyl ether resins, polyethylene glycol diglycidyl ether resins, phenol novolak polyglycidyl ether resins, cresol novolak polyglycidyl ether resins, phthalic acid diglycidyl ether resins, N,N-diglycidyl aniline resins, etc.; phenol resins such as phenol-formaldehyde resins, cresol-formaldehyde resins, etc.; unsaturated polyester resins such as propylene glycol maleate phthalate/styrene, propylene glycol maleate isophthalate/diallyl phthalate, diethylene glycol maleate phthalate/styrene, etc.; polyimide resins such as pyromellitic anhydride/methaphenylene diamine, pyromellitic anhydride/4,4'-diaminodiphenylmethane, etc.; furan resins such as furfuryl alcohol/furfural, furfural/phenol, etc. and mixtures thereof.

Fibers incorporated in these thermosetting resins as a reinforcing material include organic or inorganic fibers, such as glass fibers, carbon fibers, graphite fibers, asbestos and mixtures thereof. The amount of the fiber introduced in the cured thermosetting resin layer is about 10 to 75% by volume and preferably about 50 to 70% by volume. When the amount is less than 10% by volume insufficient reinforcing effect is obtained. On the other hand, above 75% by volume, the binding force of the thermosetting resin is reduced, leading to a reduction in the characteristics of the thermosetting resin.

The reinforcing fiber can be introduced in desired forms, such as continuous fibers orientated in one direction, a woven or nonwoven fabric braid, knit and so on. The length of the fiber is usually not less than about 0.5 mm and most preferably not less than about 3 mm.

The cured thermosetting resin layer used in this invention can be produced by a procedure well known in the art. For example, strands of fibers arranged in one direction or a cloth is dipped in a solution of an uncured thermosetting resin, dried, placed between two plates and heated under pressure to cure the thermosetting resin.

The thickness of one cured thermosetting resin layer is determined depending upon the purpose for which the laminated structure is used. The thickness is generally in a range of about 0.02 to 5 mm and preferably about 0.05 to 2 mm. When the thickness is less than about 0.02 mm, the mechanical properties of the laminated structure is reduced, whereas when the thickness is more than about 5 mm, the amount of deformation of the laminated structure which is possible to reduced. However, if the molding is possible, the thickness may be more than 5 mm.

To facilitate the molding of the fiber reinforced cured thermosetting resin layer, it is preferred that the cured thermosetting resin layer having the desired thickness be subdivided, i.e., a plurality of thin cured thermosetting resin layers be provided as illustrated in FIGS. 3 and 4. The thickness of the subdivided layer can be determined by the degree of curvature of the molded product desired. The larger degree of curvature requires a thinner layer. In this case, as described above, a plurality of cured thermosetting resin layers and thermoplastic resin layers may be superposed on one another with a slippage layer interposed between them, as illustrated in FIG. 3. Alternatively, as illustrated in FIG. 4, two or more cured thermosetting resin layers may be superposed on each other with a slippage layer interposed between them and provided on the thermoplastic resin layer with a thermoplastic slippage layer therebetween.

The suitable number and total thickness of these fiber reinforced cured thermosetting resin layers can be determined depending upon the kind of the thermosetting resin used and the purpose of the laminate. The total thickness of the fiber reinforced cured thermosetting resin layers is usually about 0.02 mm to about 1 cm from a practical standpoint. However, if molding is possible, the total thickness may be more than 1 cm.

Molded articles having preferred strength and rigidity are obtained by providing the cured thermosetting resin layer on the outside of the laminated structure in contrast to providing it at the center thereof.

Thermoplastic resins which can be used in preparing the thermoplastic resin layer of this invention, include, for example, polyethylenes, polypropylenes, polyamides, such as Nylon 6 and Nylon 6.6, polyacetals such as polyoxymethylene, polystyrenes, polyvinyl chlorides, polycarbonates such as a polycondensate of bisphenol A and phosgene, and mixtures thereof.

The thermoplastic resin layer has a thickness that provides sufficient rigidity capable of preventing the fiber reinforced cured thermosetting resin layer (which has been deformed by exterior applied forces in molding the laminate), from resuming its original form through the internal stress of the cured thermosetting resin layer.

The total thickness of the thermoplastic resin layer or layers varies depending upon the mechanical characteristics of the thermoplastic resin layer and the cured thermosetting resin layer. In general, the thickness of the thermoplastic resin layer is about 1 to 100 times the total thickness of the cured thermosetting resin layers. When the thickness of the thermoplastic resin layer is less than that of the fiber cured thermosetting resin layer, it usually becomes difficult to mold the laminate.

A reinforcing material can be incorporated in the thermoplastic resin layer. The same fibers as used in the cured thermosetting resin layer can be used in the thermoplastic resin layer and in the same manner. The amount of the reinforcing fiber incorporated in the thermoplastic resin layer ranges from the amount in which the reinforcing effect begins to be obtained, to such an amount that the cured thermosetting resin can still be molded into a form of a plate sheet or film. This means the amount of the fiber incorporated in the thermoplastic resin layer is generally about 10 to 50% by weight.

The slippage layer should be capable of bonding to the fiber reinforced thermosetting resin layer and the thermoplastic resin layer.

Figure 5:
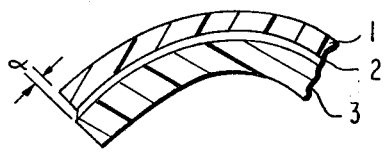
FIG. 5 is a cross-sectional view of a molded article prepared by molding the laminated structure shown in FIG. 1.

When the laminate shown in FIG. 1 for example, is molded, the cured thermosetting resin layer (1) and the thermoplastic resin layer (3) do not meet at the end of the laminate, that is to say, there is a deviation (d) as illustrated in FIG. 5. Therefore, the slippage layer must be capable of being in the molten state upon molding and permitting slippage between the fiber reinforced thermosetting resin layer and the thermoplastic resin layer or between two thermosetting resin layers and be capable of making the molded article maintain the laminated structure and constant shape.

When a thermosetting resin is used in the slippage layer, the deviation (d) cannot be smoothly formed. This leads to breakage of the laminated structure and peeling of the layers. Therefore, the resin used in preparing the slippage layer is a material comprising a thermoplastic resin capable of showing fluidity on heating.

Those materials making up the thermoplastic resin used in the slippage layer must be capable of being in the molten state at lower temperatures than the moldable temperature of the thermoplastic resin i.e., the temperature at which the thermoplastic resin layer can be deformed on applying pressure. They must also be able to bond the cured thermosetting resin layer and the thermoplastic resin layer at such temperatures as not to cause a change in the form of the thermoplastic resin layer. As thermoplastic resins for use in producing the slippage layer, there are employed those thermoplastic resins having melting points or softening points (in the case that a resin having no clear melting point is used) which are more than 5° C., preferably more than 10° C. lower than the melting point or softening point of the thermoplastic resin constituting the thermoplastic resin layer.

Representative examples of suitable thermoplastic resins which can be used in the slippage layer of this invention, include acrylic acid based polymers such as ethyl acrylate/methyl methacrylate copolymer, butyl acrylate/methyl methacrylate copolymer, etc.; vinyl acetate based polymers such as polyvinyl acetate, vinyl acetate/ethylene copolymer, etc.; olefin polymers such as ethylene/propylene copolymer, ethylene/isobutyl acrylate copolymer, isobutylene/normal butylene copolymer, etc.; thermoplastic synthetic rubber, such as a styrene-butadiene copolymer, an acrylonitrile-butadiene copolymer, polyamides such as nylon 6, 10, nylon 11 and nylon 12, etc.

The thickness of the slippage layer is generally about 0.02 to 1 mm and preferably about 0.05 to 0.2 mm although it varies depending upon the kind of the thermoplastic resin used in preparing the slippage layer. When the thickness of the slippage layer is less than about 0.02 mm, usually sufficient bonding strength and sufficient fluidity are not obtained to incur the deviation smoothly. On the other hand, when the thickness is more than about 1 mm, usually the mechanical characteristics of the laminated structure are reduced because the resin generally used as the slippage layer usually has poorer mechanical characteristics than the resin generally used as the thermoplastic resin layer.

Attempts to bond the cured thermosetting resin layer and the thermoplastic resin layer directly using the bonding power of the thermoplastic resin constituting the thermoplastic resin layer without any slippage layer have proven undesirable because, in molding the laminated structure, the molding temperature must be elevated to the melting point or softening point of the thermoplastic resin constituting the thermoplastic resin layer, and at these elevated temperatures, the thermoplastic resin layer begins to flow due to the molding pressure. For this reason, thermoplastic resins having lower melting or softening points than that of the thermoplastic resin constituting the thermoplastic resin layer are employed in preparing the slippage layer of this invention. The use of these thermoplastic resins enables molding under pressure while keeping the slippage layer in the molten state.

The cured thermosetting resin layer, the thermoplastic resin layer, and the slippage layer can further contain those additives generally used in the art, such as a coloring agent, a flame retardant, a filler, other modifying agents, etc.

When the laminate includes two or more fiber reinforced cured thermosetting resin layers or thermoplastic resin layers or slippage layers, the components and composition of the layers may be different from each other. For example, the laminate may include two or more cured thermosetting resin layers containing different fibers as a reinforcing agent. By providing a fiber reinforced cured thermosetting resin layer containing a glass fiber as the outermost layer of the laminated structure and a fiber reinforced cured thermosetting resin layer containing a carbon fiber as an intermediate layer, there can be obtained a laminated structure having high impact resistance and electrolytic corrosion resistance.

To produce the laminate of this invention, the fiber reinforced cured thermosetting resin layer and the thermoplastic resin layer can be separately produced first and then bonded to each other by use of a thermoplastic resin which is used as a slippage layer. Alternatively, the thermoplastic resin layer can be produced in advance and laminated with an uncured fiber reinforced thermosetting resin layer using a resin used as a slippage layer interposed between them, by heating to cure the fiber reinforced thermosetting resin and, at the same time, to bond together the thermoplastic resin layer and the fiber reinforced thermosetting resin layer. Of course, various other modifications and procedures can be used as will certainly be recognized by one skilled in this art.

In general, each layer is produced in the form of a plate, sheet or film and the layers are laminated and bonded together. Alternatively, layers bent or molded in another shape, for example, a shape with a certain curvature or an angle, in advance may be laminated and bonded together.

Adhesion between the thermoplastic resin layer with the thermosetting resin layer or two thermosetting layers is conducted by interposing a film comprising of a thermoplastic resin used as a slippage layer and bonding the layers by heating under pressure. Instead of use of film can be conducted using a molten thermoplastic resin or a solution of the resin.

The laminate of this invention is molded by heating it to at least the moldable temperatures of the thermoplastic resin layer. It is, however, preferred that the laminate of this invention is placed between molds having predetermined shapes, usually curves, and then molded under pressure.

Heat-curable resin structures are usually molded into the desired shape at the time of curing the thermosetting resin. Using the laminated structure of this invention, however, the thermosetting resin can be molded in advance as a suitable laminate, and thereafter it can be molded into the desired shape. Thus, the laminated structure of this invention can be subjected to repeated heat-molding. The laminate of this invention also has high strength and rigidity as compared with those molded articles made of thermoplastic resins alone. The laminated structure of this invention is suitable for use in making a waved plate, a conduit pipe, a pipe joint, a fan blade, a ski plate, a pen holder for recording, a shank for shoes, and so on.

The following examples are given to illustrate this invention in greater detail.

EXAMPLE 1

Three 0.1 mm thick uncured epoxy resin prepreg plates [containing 100 weight parts of bisphenol A diglycidyl ether, 5 weight parts of $BF_3$ monoethanol amine and 160 weight parts of carbon fibers (Besfight HTA 7-6000 produced by Toho Beslon Co., Ltd.; a monofilament has a diameter of 7 microns, a tensile strength of 300 $Kg/mm^2$ and a tensile modulus of $24 \times 10^3$ $kg/mm^2$)] arranged in one direction were placed one upon another and cured by heating at 170° C. to produce a 0.3 mm thick plate. This plate was employed as a fiber reinforced cured thermosetting resin layer. The fiber content of this plate was 60% by volume.

As a thermoplastic resin layer, a 1 mm thick polyethylene plate (m.p., 110° C.) was employed.

The carbon fiber reinforced epoxy resin plate and polyethylene plate were bonded together by heating at 105° C. for 10 minutes with a 0.1 mm thick polyolefin film (ethylene-propylene copolymer produced by Sumitomo Chemical Co., Ltd., under the name of Bandfast B). Thus, a laminated material having the sandwich construction as illustrated in FIG. 1 was obtained.

The bending strength in the direction of the fiber of the laminated material was 58 kg/mm², and the bending stiffness was 5.0 ton/mm².

This laminated material was heated to 100° C., placed on a semicircular-cylindrical mold having a radius of curvature of 30 mm, and heat-pressed at 5 kg/cm² for 10 minutes. After being cooled to room temperature, the laminated material was removed, and there was thus obtained a semicircular-cylindrical laminated structure having a radius of curvature of 30 mm.

This laminated structure can be employed as a shank for the production of men's shoes.

EXAMPLE 2

Three 0.1 mm thick epoxy resin prepreg sheets [pre-impregnated material (Q-1112 produced by Toho Beslon Co., Ltd.) containing carbon fibers (Besfight HTA 7-6000) arranged in one direction] were placed one upon another and cured by heating at 135° C. to produce a 0.3 mm thick plate. This plate was employed as a fiber reinforced cured thermosetting resin layer. The fiber content of this plate was 65% by volume.

As a thermoplastic resin layer, a 1 mm thick polyethylene plate (m.p., 140° C.) was employed.

The carbon fiber reinforced epoxy resin plate and polyethylene plate were bonded together by heating at 120° C. for 10 minutes with a 0.1 mm thick polyolefin film (ethylene-propylene copolymer produced by Sumitomo Chemical Co., Ltd., under the name of Bondfast A) therebetween. Thus, a laminated material having the sandwich construction as illustrated in FIG. 1 was obtained.

The bending strength in the direction of the fiber of the laminated material was 64 kg/mm², and the bending stiffness was 5.6 ton/mm².

This laminated material was heated to 120° C., placed on a semicircular-cylindrical mold having a radius of curvature of 30 mm, and heat-pressed at 5 kg/cm² for 10 minutes. After being cooled to room temperature, the laminated material was removed, and there was thus obtained a semicircular-cylindrical laminated structure having a radius of curvature of 30 mm.

This laminated structure can be employed as a shank for the production of men's shoes.

EXAMPLE 3

An unsaturated polyester resin prepreg (Q-1201 produced by Toho Beslon Co., Ltd.) containing the same carbon fiber as used in Example 2 arranged in one direction, was cured at a temperature of 150° C. to produce a 0.1 mm thick plate. This plate was used as a carbon fiber reinforced cured thermosetting resin layer. The fiber content of this plate was 66% by volume.

As a thermoplastic resin layer, a 1 mm thick polyethylene plate (m.p., 140° C.) was employed.

Three carbon fiber reinforced thermosetting resin plates as prepared above and three 0.1 mm thick films of the same polyolefin film (Bondfast A) as used in Example 2 were superposed alternately and provided on both sides of the polyethylene plate. The material so prepared was bonded by heating at a temperature of 120° C. and pressure of 3 kg/cm² for 10 minutes, and there was thus obtained a laminated material as illustrated in FIG. 4.

The bending strength in the direction of the fiber of the laminated material was 65 kg/mm² and the bending stiffness was 5.7 ton/mm².

This laminated material was heated to 120° C., placed on a semicircular-cylindrical mold having a radius of curvature of 25 mm, and molded at a pressure of 4 kg/cm². After being cooled to room temperature, the laminated material was removed, and there was thus obtained a semicircular-cylindrical laminated structure having a radius of curvature of 25 mm.

This laminated structure can be employed as a shank for the production of lady's shoes.

EXAMPLE 4

Samples A, B and C were produced in the same manner as in Example 2 except that orientation of carbon fibers in thermosetting resin layers (i.e., prepreg sheets) and thickness of each layer were as shown in the Table shown below.

As shown in the Table, in prepreg sheets in Samples A–C, the orientation of fibers in the outermost layers was parallel with the direction of the length of the sheet (in the table such orientation is shown as 0°), and the orientation of fibers in the inner layers was made a right angle with the direction of the length of the sheet (in the Table such orientation is shown as 90°). Resin layers and adhesive layers are superposed in the same order as in the Table.

Samples A and B were molded in the same manner as the Example 2 to obtain Samples A' and B'. Samples C was molded in the same manner as the Example 2 except that the radius of curvature of the mold was 400 mm to obtain Sample C'.

Samples A, B and C could be molded very smoothly due to occurence slippage between resin layers in spite of thickness of resin layers.

TABLE

|  |  | Sample A | Sample B | Sample C |
|---|---|---|---|---|
| Thermosetting Resin Layer | 0° | 0.2 mm | 0.2 | 1.0 |
|  | 90° | 0.1 | 0.1 | 1.0 |
| Adhesive Layer |  | 0.1 | 0.1 | 0.1 |
| Thermoplastic Resin Layer |  | 0.5 | 1.0 | 3.0 |
| Adhesive Layer |  | 0.1 | 0.1 | 0.1 |
| Thermosetting Resin Layer | 90° | 0.1 | 0.1 | 1.0 |
|  | 0° | 0.2 | 0.2 | 1.0 |

While the invention has been described in detail and with reference to specific embodiments thereof, it will be apparent to one skilled in the art that various changes and modifications can be made therein without departing from the spirit and scope thereof.

What is claimed is:

1. A heat-moldable laminate comprising at least one thermoplastic resin layer, at least one fiber reinforced cured thermosetting resin layer about 0.02 to 5 mm thick, and at least one slippage layer about 0.02 to 1 mm thick interposed between the resin layers, wherein the slippage layer comprises a thermoplastic resin and is capable of being in the molten state at lower temperatures than the moldable temperature of the thermoplastic resin, said slippage layer permitting slippage between said resin layers, said thermoplastic resin layer having a thickness that provides sufficient ridigity capable of preventing the fiber reinforced cured thermosetting resin layer from resuming its original form through internal stress of the reinforced cured thermosetting resin layer when it is deformed by exterior applied forces upon molding the laminate.

2. The heat-moldable laminate as claimed in claim 1, consisting of the thermoplastic resin layer, the fiber reinforced cured thermosetting resin layer, and the slippage layer interposed between the thermoplastic resin layer and the fiber reinforced cured thermosetting resin layer.

3. The heat-moldable laminate as claimed in claim 1, wherein at least one fiber reinforced cured thermosetting resin layer is provided on both sides of the thermoplastic resin layer.

4. The heat-moldable laminate as claimed in claim 1, wherein a plurality of the thermoplastic resin layers and a plurality of the fiber reinforced cured thermosetting resin layers are superposed alternately with the slippage layer interposed between them.

5. The heat-moldable laminate as claimed in claim 1 or 4, wherein the fiber reinforced cured thermosetting resin layer is divided into two or more fiber reinforced cured thermosetting resin sublayers.

6. The heat-moldable laminate as claimed in claim 1, wherein the thermosetting resin constituting the fiber reinforced cured thermosetting resin layer is at least one resin selected from the group consisting of an epoxy resin, a phenol resin, an unsaturated polyester resin, a polyimide resin and a furan resin.

7. The heat-moldable laminate as claimed in claim 1, wherein the fiber incorporated in the fiber reinforced cured thermosetting resin layer is at least one fiber selected from the group consisting of glass fiber, carbon fiber, graphite fiber and asbestos.

8. The heat-moldable laminate as claimed in claim 1, wherein the fiber is contained in the fiber reinforced cured thermosetting resin layer in at least one form selected from the group consisting of continuous fiber arranged in one direction, a woven fabric, a knit, a braid and non-woven fabric.

9. The heat-moldable laminate as claimed in claim 1, wherein the length of the fiber contained in the fiber reinforced cured thermosetting resin layer is at least 0.5 mm.

10. The heat-moldable laminate as claimed in claim 1, wherein the thermoplastic resin constituting the thermoplastic resin layer is at least one resin selected from the group consisting of polyethylene, polypropylene, a polyamide, a polyacetal, a polystyrene, a polyvinyl chloride, and a polycarbonate.

11. The heat-moldable laminate as claimed in claim 1, wherein the thermoplastic resin layer contains a reinforcing fiber.

12. The heat-moldable laminate as claimed in claim 1, wherein the resin used in the slippage layer is at least one thermoplastic resin selected from the group consisting of an acryl based polymer, a vinyl acetate based polymer, an olefin based polymer, and thermoplastic synthetic rubber.

13. The heat-moldable laminate as claimed in claim 1, wherein the softening point of the thermoplastic resin constituting the slippage layer is at least 5° C. lower than that of the thermoplastic resin constituting the thermoplastic resin layer.

14. The heat-moldable laminate as claimed in claim 1, wherein the outermost layers of said laminate are fiber reinforced cured thermosetting resin layers.

15. The heat-moldable laminate as claimed in claim 1, wherein said at least one fiber reinforced cured thermosetting resin layer contains about 10 to about 75% by volume of said fibers.

16. The heat-moldable laminate as claimed in claim 1, wherein said at least one fiber reinforced cured thermosetting resin layer contains 50 to 70% by volume of said fibers.

17. The heat-moldable laminate as claimed in claim 1, wherein said at least one fiber reinforced cured thermosetting resin layer has a thickness of about 0.02 to 5 mm, said at least one thermoplastic resin layer is about 1 to 100 times the total thickness of the fiber reinforced cured thermosetting resin layer(s) present, said at least one slippage layer has a thickness of about 0.02 to 1 mm and the total thickness of the fiber reinforced cured thermosetting resin layers present is about 0.02 to 1 cm.

18. The heat-moldable laminate as claimed in claim 17, wherein said at least one fiber reinforced cured thermosetting resin layer has a thickness of about 0.05 to 2 mm, and said at least one slippage layer has a thickness of about 0.05 to 0.2 mm.

19. A process for molding a laminate into a molded product which comprises heating a heat-moldable laminated structure comprising at least one thermoplastic resin layer, at least one fiber reinforced cured thermosetting resin layer about 0.02 to 5 mm thick, and at least one slippage layer about 0.02 to 1 mm thick interposed between the resin layers, wherein said resin layers are bonded with said slippage layer, said slippage layer comprising a thermoplastic resin and capable of being in the molten state at lower temperatures than the moldable temperature of the thermoplastic resin layer, said adhesive layer permitting slippage between said resin layers, to at least the moldable temperature of the thermoplastic resin layer, and molding the so heated laminate, said thermoplastic resin layer having a thickness that provides sufficient rigidity capable of preventing the fiber reinforced cured thermosetting resin layer from resuming its original form through internal stress of the reinforced cured thermosetting resin layer when it is deformed by exterior applied forces upon molding the laminate.

20. The process for molding as claimed in claim 19, wherein the laminate is placed on a mold and molded by heating under pressure.

21. The process for molding as claimed in claim 19, wherein the softening point of the thermoplastic resin constituting the slippage layer is at least 5° C. lower than the thermoplastic resin constituting the thermoplastic resin layer.

22. The process for molding as claimed in claim 19, wherein said at least one fiber reinforced cured thermosetting resin layer contains about 10 to 75% by volume of said fibers.

23. The process for molding as claimed in claim 19, wherein said at least one fiber reinforced cured thermosetting resin layer conains about 50 to 70% by volume of said fibers.

24. The process for molding as claimed in claim 19, wherein said at least one fiber reinforced cured thermosetting resin layer has a thickness of about 0.02 to 5 mm, said at least one thermoplastic resin layer is about 1 to 100 times the total thickness of the fiber reinforced cured thermosetting resin layer(s) present, and the total thickness of the fiber reinforced cured thermosetting resin layers present is about 0.02 to 1 cm.

25. The process for molding as claimed in claim 24, wherein said at least one fiber reinforced cured thermosetting resin layer has a thickness of about 0.05 to 2 mm, and said at least one slippage layer has a thickness of about 0.05 to 0.2 mm.

26. A molded laminate produced by the process of claim 19.

* * * * *